United States Patent [19]
Greenwood et al.
[11] 4,295,888
[45] Oct. 20, 1981

[54] SOLVENT COMPOSITIONS

[75] Inventors: Gillian M. Greenwood; Alan Woodstock, both of Runcorn, England
[73] Assignee: Imperial Chemical Industries Limited, London, England

[21] Appl. No.: 757,776
[22] Filed: Dec. 27, 1976
[30] Foreign Application Priority Data
Jan. 19, 1976 [GB] United Kingdom ................ 1999/76
[51] Int. Cl.[3] ............................................ C09D 11/00
[52] U.S. Cl. ...................................... 106/21; 106/22; 106/32; 282/27.5
[58] Field of Search .................... 106/14.5, 21, 22, 23, 106/31, 32, 270; 282/27.5; 260/45.95 M

[56] References Cited

U.S. PATENT DOCUMENTS

| | | | |
|---|---|---|---|
| 2,646,367 | 6/1951 | Davis et al. | 117/36 |
| 2,754,218 | 7/1956 | Magie | 106/22 |
| 2,787,639 | 4/1957 | Sargent | 252/554 |
| 3,210,277 | 10/1965 | Swift et al. | 252/42.7 |
| 3,432,327 | 3/1969 | Kan et al. | 117/36.2 |
| 3,560,229 | 2/1971 | Farnham et al. | 106/21 |
| 3,933,512 | 1/1976 | Heintzelman et al. | 106/22 |
| 4,021,595 | 5/1977 | Kiritani et al. | 428/307 |
| 4,038,087 | 7/1977 | Sugisaki et al. | 106/32 |
| 4,087,284 | 5/1978 | Golden et al. | 106/21 |
| 4,147,830 | 4/1979 | Kato et al. | 428/307 |
| 4,159,208 | 6/1979 | Hayashi et al. | 428/307 |
| 4,165,398 | 8/1979 | Raine et al. | 427/150 |

FOREIGN PATENT DOCUMENTS

| | | |
|---|---|---|
| 1944634 | 9/1969 | Fed. Rep. of Germany . |
| 2126450 | 12/1971 | Fed. Rep. of Germany . |
| 2228430 | 11/1973 | Fed. Rep. of Germany . |
| 1091076 | 10/1964 | United Kingdom . |
| 1091077 | 10/1964 | United Kingdom . |
| 1019924 | 2/1966 | United Kingdom . |
| 1029031 | 5/1966 | United Kingdom . |
| 1140652 | 1/1969 | United Kingdom . |
| 1152889 | 5/1969 | United Kingdom . |
| 1179374 | 1/1970 | United Kingdom . |
| 1252328 | 11/1971 | United Kingdom . |
| 1296477 | 11/1972 | United Kingdom . |
| 1312861 | 4/1973 | United Kingdom . |
| 1348961 | 3/1974 | United Kingdom . |
| 1358965 | 7/1974 | United Kingdom . |
| 1401706 | 7/1975 | United Kingdom . |

*Primary Examiner*—Morton Foelak
*Assistant Examiner*—Amelia B. Yarbrough
*Attorney, Agent, or Firm*—Cushman, Darby & Cushman

[57] ABSTRACT

The proportion of residual solvent in a solid chlorinated polymer prepared by chlorination in a chlorine-resistant solvent and subsequent treatment with steam or hot water is reduced by carrying out the said treatment in the presence of a polymer lubricant.

11 Claims, No Drawings

SOLVENT COMPOSITIONS

This invention relates to improved pressure-sensitive copying papers and compositions therefor.

Pressure-sensitive copying papers otherwise described as carbon-free copying papers have been known for many years. They comprise an upper support sheet of paper to one face of which there is applied a coating comprising a colour forming compound in an organic solvent. The coating applied to the paper may be for example in the form of a microencapsulated solution of the colour former in the solvent or in the form of an extremely thin, emulsified, sealed layer of colour former in the solvent. This upper sheet is associated with a lower sheet to one face of which is applied a coating of an electron-acceptive acid substance. If desired there may be an intervening sheet to one face of which is applied the coating comprising the colour former and to the other face of the sheet is applied the coating of the electron-acceptive acid substance. Again one face of the intervening sheet may have a lower coating composition comprising the colour former and an upper coating containing the electron-acceptive material; again in such an intervening sheet a coating composition comprising the colour former may also be applied to the other side of the intervening sheet.

When applying local pressure as by a pencil the coating comprising the colour former is punctured and the colour-former which is electron-donating reacts with the electron-acceptive substance to form a coloured mark. Colour-formers are well known and include by way of example crystal violet lactone, malachite green lactone, benzoylleuco methylene blue and rhodamine-B lactam. The electron-acceptive acid substances are likewise well known and include such absorbent substances as acid clays, attapulgite, zeolite, bentonite, phenolic resins and compositions comprising organic acids such as succinic acid.

Many organic liquids may be employed as solvents for the colour-forming compound, perhaps the most common being modified terphenyls and alkylated naphthalene.

More recently it has been proposed (see UK Pat. No. 1,296,477 to use as solvent for the colour former a chlorinated straight-chain paraffin hydrocarbon having 6 to 18 carbon atoms and a chlorination degree of 20% to 60% by weight. Such solvent is useful and has a range of desirable features. These include for example a high boiling point, a high colour density of the mark on application of local pressure, a low viscosity and absence of offensive smell. The solvent on admixture with the colour-former is also said not to give rise to spontaneous colour formation. If spontaneous colour formation does occur this is undesirable since a colour fog is generated in the copying paper. Chlorinated straight-chain paraffin hydrocarbons may not cause spontaneous conversion of the colour-former to give a deep colour, for example, a dark blue colour. In our experience however we find that the solution develops a mild colouration even at room temperature and this colouration increases markedly at elevated temperatures and increased times. The colouration of the solution over a period of time can lead to mild fogging of the copying paper and this effect increases in sunlight.

Chlorinated straight-chain paraffins are useful as solvents for the colour-former and the pressure-sensitive copying paper obtained when using said solutions containing the chlorinated straight-chain paraffin are quite serviceable. However such is the high quality of appearance of pressure-sensitive copying paper which is asked for at the present time that said solvents are not entirely satisfactory inasmuch as they are liable to produce even mild colouration of the colour-former.

We find that compositions comprising a chlorinated paraffin solvent containing specific adjuvants effect a significant reduction in colour formation on contact with a colour-former and such compositions provide a basis for eminently useful pressure-sensitive-copying papers.

According to the present invention there is provided a pressure-sensitive copying paper having applied thereon a coating composition comprising a compound capable of colour-forming on contact with an electron-acceptive acid substance, a chlorinated substantially straight-chain paraffin having a range of carbon atoms between 7 and 35 and of chlorine content 10% by weight to 72% by weight and having at least one of the following adjuvants:

(a) a barium, calcium or magnesium sulphonate
(b) a barium, calcium or magnesium phenate
(c) a nitrogen—containing derivative of an alkenyl succinic acid or of an alkenyl succinic anhydride.

The barium, calcium and magnesium sulphonates can be natural or synthetic materials. They are commercially available and are derived from alkyl, aromatic or aralkyl hydrocarbons. They are eminently useful as adjuvants and may be neutral or overbased. The overbased sulphonates are those known to be obtained by treating the parent sulphonic acid with an excess of barium, calcium or magnesium hydroxide. These overbased sulphonates may have a basicity corresponding to 10 to 300 mg KOH/gram of sulphonate.

The barium, calcium or magnesium phenates which may be used as adjuvants have in their simplest form the structure:

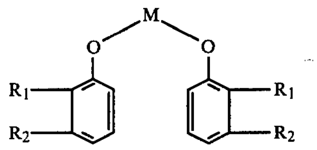

where M is an atom of barium, calcium or magnesium, $R_1$ is hydrogen or an alkyl group containing 1 to 10 carbon atoms and $R_2$ is an alkyl group containing 1 to 10 carbon atoms. When $R_1$ as well as $R_2$ is an alkyl group $R_1$ will usually be the same as $R_2$ since such compounds are more easily prepared. The phenates may also be overbased. The phenate may contain additionally a proportion of sulphur in the form of a sulphur linkage or a dithio linkage between the two aromatic nuclei.

Adjuvants (c) are the so called and well known ashless detergents, used to prevent deposition of sludge in gasoline and diesel oil. A typical example of adjuvant (c) is the product obtained by the reaction of polyisobutylene (mol. wt. circa 1000) with maleic anhydride followed by further reaction with tetraethylene pentamine.

The chlorinated paraffin is substantially straight-chain but commercial chlorinated paraffins which contain a proportion of chlorinated isoparaffins, for example 0.5% to 25% by weight can be used.

The chlorinated paraffins may suitably be those having a range of carbon atoms between 6 and 18 and of chlorine content 20% to 60% by weight. However chlorinated paraffins of carbon atoms for example in the range 19 to 35 atoms may be employed. Also chlorinated paraffins of higher chlorine content, for example, greater than 60% by weight and up to 72% by weight may be used. Again chlorinated paraffins having a range of carbon atoms from 11 to 19 and of 17% by weight to 19% by weight of chlorine may be employed.

The concentration of the adjuvant in the chlorinated paraffin depends essentially on the particular adjuvant and on the chlorinated paraffin employed but is such that it at least reaches the colouration formed when using the chlorinated paraffin solvent alone. Such a concentration is easily obtained by simple experimentation. Usually at least 0.05% by weight of the adjuvant with respect to chlorinated paraffin solvent is employed. There is no advantage in employing greater than 2% by weight of the adjuvant. Indeed very useful results can be obtained when using 0.2% to 1% by weight of the adjuvant.

It is possible that an adjuvant, for example, a barium, calcium or magnesium sulphonate may be desired at a particular concentration in the chlorinated paraffin but may not be freely soluble at such a concentration. In such a case a solubilising agent may be employed. For example with said sulphonates there may be used as solubilising agents polyethylene glycols, for example those of molecular weight in the approximate range 200 to 650.

Sequestering agents, for example, pentaerythritol esters of long-chain fatty acids and alkyl or aryl phosphites may be added to the solvent compositions.

We have also found that antioxidants particularly those of the hindered phenol type are eminently useful when added to the chlorinated paraffin solvent compositions. Typical examples of such antioxidants are 1-methyl cyclohexyl derivatives of selected xylenols in particular 2,4-xylenols for example those available under the Trade Mark 'Nonox' WSL from Imperial Chemical Industries Limited. Other antioxidants are 4-methyl, 2,6-ditertiary butyl phenol similarly available in different grades under the Trade Mark 'Topanol' O and 'Topanol' OC, 2,4-dimethyl, 6-tertiary butyl phenol similarly available in suitable form under the Trade Mark 'Topanol' A, tris-(2-methyl-4 hydroxy-5-t-butylphenyl) butane similarly available under the Trade Mark 'Topanol' CA and 3,5-ditertiary butyl 4-hydroxy anisole.

The solvent composition may also contain known stabilisers for the chlorinated paraffin for example epoxidised oils such as epoxidised soya bean oil or expodized resins.

The chlorinated paraffin solvent may if desired be blended with another solvent e.g. hydrocarbon diluent solvent.

While the coating compositions may be applied as a solution of the colour former in the solvent they may also be applied in the form of an emulsion of the solvent and colour former in water.

Microencapsulation of the coating compositions can be carried out by using known techniques. The microcapsules surrounding the composition may be of known materials such as natural and synthetic film forming materials including for example gum arabic, gelatin and carboxy methyl cellulose.

The invention includes within its scope compositions comprising a chlorinated substantially straight-chain paraffin having a range of carbon atoms between 7 to 35 and of chlorine content 10% by weight to 72% by weight and at least one of the following adjuvants:

(a) a barium, calcium or magnesium sulphonate
(b) a barium, calcium or magnesium phenate
(c) a nitrogen containing derivative of an alkenyl succinic acid or of an alkenyl succinic anhydride.

Suitably such compositions also contain a compound capable of colour forming in contact with an electron-acceptive acid substance.

The invention also includes within its scope compositions (solutions or emulsions) also containing at least one material selected from aforesaid solubilising agents, antioxidants and stabilisers.

The following Examples illustrate the invention.

EXAMPLE 1

The Example was carried out to illustrate in the first instance the significant reduction of colour formation in compositions used in the production of pressure-sensitive copying paper.

25 grams of chlorinated substantially straight-chain paraffin hydrocarbons containing 2% (w/W) of a colourformer and specified adjuvants according to the invention were heated at 120° C. over a period of time. At specific time intervals of 5, 10, 15, 25 and 45 minutes approximately 2 ml samples were taken and were cooled rapidly to ambient temperature by means of a cooling bath which was at temperature of −10° C. The optical density of each sample at 594 nm, was measured in a 0.5 cm glass cell in a Unicam SP600 spectrophotometer against a blank of the same type of chlorinated paraffin hydrocarbon (without adjuvant and without colour former) which had been heated under the same conditions.

The chlorinated paraffins were:

A A chlorinated substantially straight-chain paraffin having 19 to 35 carbon atoms and 42% (w/w) chlorine content, available under the Trade Mark 'Cereclor'42 from Imperial Chemical Industries Limited.

B A chlorinated substantially-chain paraffin having 11 to 19 carbon atoms and 45% (w/w) chlorene content similarly available under the Trade Mark 'Cereclor' S45.

C A chlorinated substantially straight-chain paraffin having 10 to 14 carbon atoms and 50% (w/w) chlorine content similarly available under the Trade Mark 'Cereclor' 50LV.

D A chlorinated substantially straight-chain paraffin having 11 to 19 carbon atoms and 18% w/w chlorine content similarly available under the Trade Mark 'Cereclor' S18.

E A chlorinated substantially straight-chain paraffin having 10 to 14 carbon atoms and 63% (w/w) chlorine content similarly available under the Trade Mark 'Cereclor' 63L.

The chlorinated paraffins were stabilised with an epoxidised oil or an epoxidised resin (chlorinated paraffin E). The overbased barium sulphonate adjuvant had a basicity corresponding to 65 mg. KOH/gram of sulphonate. The results are shown in Table 1. Where percentages are mentioned they are by weight.

TABLE 1

| Chlorinated Paraffins | + | Adjuvants | Optical Density 5 mins | 10 mins | 15 mins | 25 mins | 45 mins |
|---|---|---|---|---|---|---|---|
| A | 0.2% | overbased barium sulphonate | 0.125 | 0.125 | | 0.27 | |
| A | 0.3% | overbased barium sulphonate | 0.09 | 0.09 | 0.09 | 0.11 | 0.14 |
| | 0.3% | polyethylene glycol (mol wt 200) | | | | | |
| | 0.2% | antioxidant ('Nonox' W.S.L.) | | | | | |
| B | | above 3 adjuvants | 0.09 | 0.09 | 0.09 | 0.11 | 0.14 |
| C | | above 3 adjuvants | 0.07 | 0.07 | 0.07 | 0.07 | 0.09 |
| D | | above 3 adjuvants | 0.03 | 0.03 | 0.03 | 0.03 | |
| E | | above 3 adjuvants | 0.11 | 0.22 | | | |
| A | 0.3% | barium phenate | | | | | |
| | 0.3% | polyethylene glycol (mol wt 200) | 0.07 | 0.07 | 0.10 | 0.17 | 0.25 |
| | 0.2% | antioxidants ('Nonox' W.S.L.) | | | | | |

COMPARISON

By way of comparison the optical densities were determined with chlorinated paraffins not containing adjuvants according to the invention

| | | | | | | |
|---|---|---|---|---|---|---|
| A | | | 1.0 | 1.10 | 1.15 | 1.15 |
| A | 1.7% | epoxidised soya bean oil | 1.17 | 1.25 | 1.35 | 1.60 |
| A | 2% | dicycloaliphatic diepoxide | 1.3 | 1.55 | 1.88 | 2.00 |
| A | 0.2% | antioxidant ('Nonox' W.S.L.) | 0.41 | 0.53 | 0.67 | 0.91 |
| A | 1.7% | epoxidised soya bean oil | | | | |
| | 0.2% | antioxidant ('Nonox' W.S.L.) | 0.33 | 0.46 | 0.58 | 0.86 |
| B | | | 0.65 | 0.80 | 0.88 | 1.24 |
| E | 0.7% | dicycloaliphatic diepoxide | 1.35 | 1.42 | 1.75 | >2.0 |

In the preparation of pressure-sensitive copying papers temperatures of the order of 80° C. to 150° C. are encountered. The preceding tests (carried out at 120° C.) were carried out under extreme conditions but these are indicative of treatment conditions sometimes met in the production of pressure-sensitive copying paper. Visible colouration of a sample of the composition which creates some colouration in the microcapsule with subsequent risk of fogging the pressure-sensitive copying paper occurs at an optical density of approximately 0.3 (and higher). From this it was evident that when using compositions containing chlorinated paraffins containing the adjuvants according to the invention that much improved results were obtained and that the above-mentioned level of optical density was not achieved.

Pressure sensitive copying papers produced when using the compositions described in the Table are of eminently good appearance and are not fogged.

EXAMPLE 2

The procedure of Example 1 was repeated was except than an ashless detergent of type (c) disclosed in the statement of invention was incorporated in the composition. The adjuvant was a monosuccinimide obtained by reacting polyisobutylene with maleic anhydride then with tetraethylene pentamine.

The results are indicated in Table 2.

TABLE 2

| Chlorinated Paraffin | + | Adjuvants | Optical Density 30 mins | 60 mins | 120 mins | 240 mins |
|---|---|---|---|---|---|---|
| B | 1% | ashless detergent | 0.044 | 0.069 | 0.132 | 0.209 |
| | 0.2% | antioxidant ('Topanol' O) | | | | |
| A | 1% | ashless detergent | 0.018 | 0.037 | 0.126 | 0.150 |
| | 0.2% | antioxidant ('Nonox' W.S.L.) | | | | |
| C | 1% | ashless detergent | | | | |
| | 0.2% | antioxidant ('Topanol' CA) | | | | 0.235 |
| B | 1.0% | ashless detergent | — | — | 0.072 | 0.121 |
| | 0.2% | antioxidant ('Nonox' W.S.L.) | | | | |

What we claim is:

1. A composition comprising a chlorinated substantially straight chain paraffin solvent having a range of carbon atoms between 7 and 35 and of chlorine content 10% by weight to 72% by weight, a compound capable of colour forming on contact with an electron-acceptive substance, an antioxidant for said chlorinated paraffin solvent, and at least one of the following adjuvants present in said solvent in amount sufficient to at least reduce the tendency of the solution of paraffin, antioxidant and colour-forming compound to discolor:

(a) a barium, calcium or magnesium sulphonate;

(b) a barium, calcium or magnesium phenate of the structure:

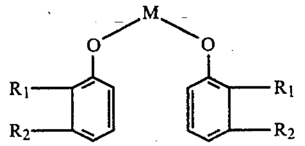

where M is an atom of barium, calcium or magnesium, $R_1$ is hydrogen or an alkyl group containing 1 to 10 carbon atoms and $R_2$ is an alkyl group containing 1 to 10 carbon atoms; and (c) a nitrogen containing derivative of an alkenyl succinic anhydride, said derivative being obtained by the reaction of polyisobutylene with maleic anhydride followed by further reaction with tetraethylene pentamine.

2. A composition as claimed in claim 1 wherein the antioxidant is of the hindered phenol type.

3. A composition as claimed in claim 2 in which the antioxidant is 1-methyl cyclohexyl derivative of 2,4-xylenols.

4. A composition as claimed in claim 2 wherein the antioxidant is 4-methyl 2,6-ditertiary butyl phenol.

5. A composition as claimed in claim 2 wherein the antioxidant is a 2,4-dimethyl,6-tertiary butyl phenol.

6. A composition as claimed in claim 2 wherein the antioxidant is tris-(2-methyl-4-hydroxy-5-t-butylphenol)butane.

7. A composition as claimed in claim 1 in which the adjuvant is present in the composition in an amount corresponding to at least 0.05% by weight but not greater than 2% by weight with respect to the chlorinated paraffin.

8. A composition as claimed in claim 1 in which the chlorinated paraffin has a range of carbon atoms between 19 and 35.

9. A composition as claimed in claim 1 in which the chlorinated paraffin has a chlorine content greater than 60% by weight and up to 70% by weight.

10. A composition as claimed in claim 1 in which the chlorinated paraffin has a range of carbon atoms from 11 to 19 and has a chlorine content of from 17% to 19% by weight.

11. A composition as claimed in claim 1 in which the composition is in the form of a solution or an emulsion.

* * * * *